(12) United States Patent
Nakamura et al.

(10) Patent No.: US 7,106,315 B2
(45) Date of Patent: Sep. 12, 2006

(54) IMAGE DISPLAY UNIT AND DISPLAY TERMINAL USING THE SAME

(75) Inventors: Suehiro Nakamura, Tokyo (JP);
Michio Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 330 days.

(21) Appl. No.: 10/124,293

(22) Filed: Apr. 17, 2002

(65) Prior Publication Data
US 2002/0190970 A1    Dec. 19, 2002

(30) Foreign Application Priority Data
Apr. 17, 2001    (JP)    ............................ P2001-118696

(51) Int. Cl.
*G09G 5/00* (2006.01)
*G09G 3/32* (2006.01)
(52) U.S. Cl. .......................................... 345/204; 345/85
(58) Field of Classification Search ......... 345/204–213
See application file for complete search history.

(56) References Cited
U.S. PATENT DOCUMENTS 5,699,104 A * 12/1997 Yoshinobu ................... 725/27
5,982,553 A * 11/1999 Bloom et al. ................ 359/627
6,081,260 A * 6/2000 Kuzunuki et al. ........... 345/173
6,088,102 A 7/2000 Manhart
6,141,530 A 10/2000 Rabowsky
6,216,228 B1 * 4/2001 Chapman et al. ............ 713/176

FOREIGN PATENT DOCUMENTS

JP          04086177 A  *  3/1992
WO       WO 97/06637        2/1997

* cited by examiner

*Primary Examiner*—Alexander Eisen
(74) *Attorney, Agent, or Firm*—Sonnenschein Nath & Rosenthal LLP

(57) ABSTRACT

An image display unit includes a linear display device. The linear display device is line-scanned to display a two-dimensional image. The linear display device has a video signal protection function. In the linear display device, video protection can be implemented using a very simple system for turning off some pixels. Device ID information can be embedded into a display terminal using the image display unit.

5 Claims, 5 Drawing Sheets

IMAGE DISPLAY UNIT AND DISPLAY TERMINAL USING THE SAME

RELATED APPLICATION DATA

The present application claims priority to Japanese Application(s) No(s). P2001-118696 filed Apr. 17, 2001, which application(s) is/are incorporated herein by reference to the extent permitted by law.

BACKGROUND OF THE INVENTION

1. Field of the Invention

The present invention relates to image display units using linear display devices and to display terminals.

2. Description of the Related Art

Conventionally, liquid crystal display (LCD) panels or digital micromirror devices (DMD™) have been used in projection display systems. Recently, a Grating Light Valve (GLV™) display, employing a grating which is made by micro-machining and which is driven by an active matrix, has been developed. The GLV display has drawn public attention.

A GLV device has many advantages over known spatial light modulators. Specifically, the GLV device can display seamless, bright images, can be manufactured at a low cost using micro-machining technology, and can operate at high speed.

The need to provide copy protection of image information and digital information and the need to perform scrambling arise in various types of displays. The above-described GLV device is also required to perform these processes.

Conventionally, in order to perform copy protection of image information and digital information and scrambling, all apparatuses, such as set top boxes (STB) and video cassette recorders (VCR), which are connected to an image display unit are required to be capable of performing copy protection and scrambling. As a result, the structure of each apparatus becomes complicated, and thus the cost of each apparatus increases.

The STB is required to perform complex image processing in order to scramble an image.

When protection is decrypted by the STB, the reality is that there is no way to prevent copying of image information and digital information.

If each display terminal is given an identification number, the identification number can be used to identify the display terminal (user terminal), so that distribution and billing can be performed.

It is difficult to record such an identification number in known image display devices.

SUMMARY OF THE INVENTION

In order to solve the foregoing problems, it is an object of the present invention to provide an image display unit capable of performing copy protection of image information and digital information and scrambling using a simple structure.

It is another object of the present invention to provide an image display unit capable of scrambling an image without performing complicated image processing.

It is still another object of the present invention to provide a display terminal to which a protection function can be added and device ID information, such as an identification number, can be easily assigned.

In order to achieve the foregoing objects, an image display unit according to an aspect of the present invention is provided including a linear display device, which is line-scanned to display a two-dimensional image, wherein the linear display device has a video signal protection function.

According to the linear display device which is line scanned to produce a two-dimensional image, video protection can be implemented using a very simple system for turning off some pixels.

According to another aspect of the present invention, a display terminal is provided including a linear display device, which is line-scanned to display a two-dimensional image, the linear display device having a video signal protection function added thereto and device ID information embedded therein; and a detection unit for detecting the display terminal using the device ID information.

In the linear display device, a memory function can be easily embedded into the same substrate. By writing the device ID information in the memory function, the display terminal can be identified in accordance with the written information.

As is clear from the foregoing description, according to an image display unit of the present invention, copy protection of image information and digital information and scrambling can be performed by a simple structure without performing complicated image processing.

According to a display terminal of the present invention, a protection function can be added, and device ID information, such as an identification number, can be easily assigned. The device ID information can be utilized in network transactions.

DESCRIPTION OF THE PREFERRED EMBODIMENTS

With reference to the accompanying drawings, an image display unit and a display terminal according to the present invention will be described in detail.

Figure 1:
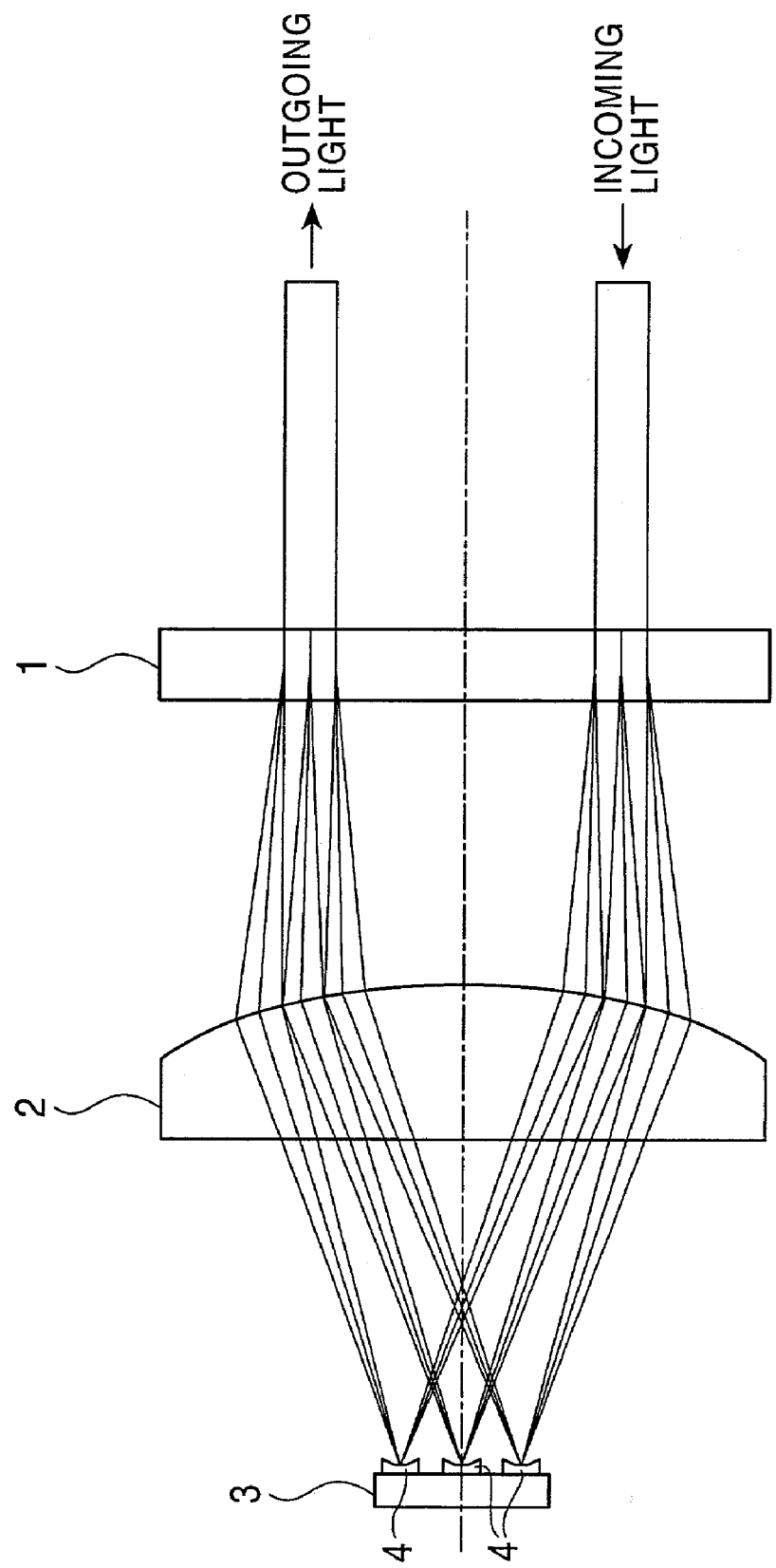
FIG. 1 is a schematic illustration of the basic structure of a GLV.
Figure 2:
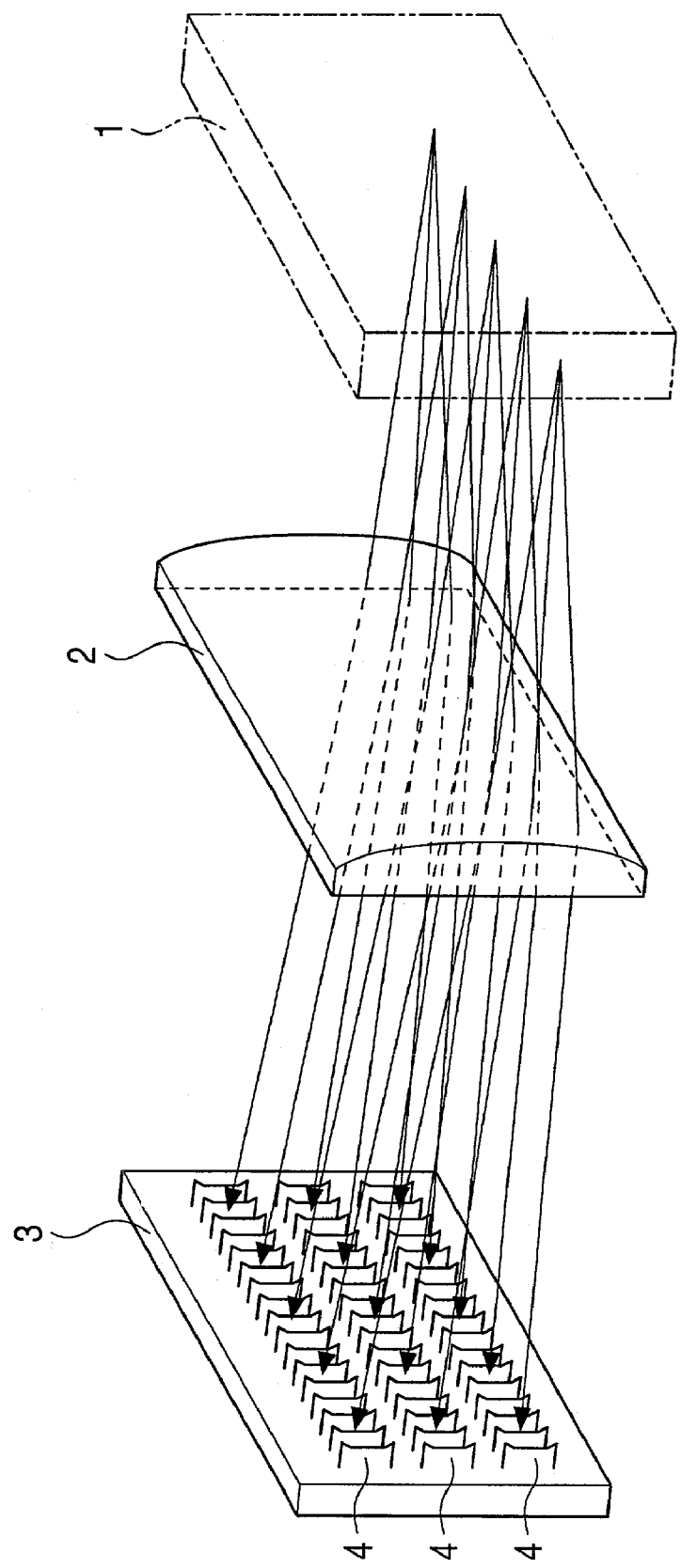
FIG. 2 is a schematic perspective view of the basic structure of the GLV.

FIGS. 1 and 2 show the basic structure of a GLV according to the present invention.

Light from a light source lamp, which is substantially parallel light, enters a volume hologram 1. The incoming light is diffracted by the volume hologram 1 in a direction in accordance with the wavelength of the light. The diffracted light is focused by a cylindrical lens 2 onto a spatial light modulator 3. Three one-dimensional GLV lines 4 are disposed at positions corresponding to three primary colors (red, green, and blue, which are referred to as RGB hereinafter) of the diffracted light.

The GLV lines 4 are integrally formed on a substrate using a semiconductor fabricating process. A driving electric circuit and wiring are provided in the periphery of each element. Each element is driven by an external signal.

Specifically, a grating corresponding to each pixel is driven by the external signal, thus causing light diffraction. More specifically, if the grating is not driven, light is not diffracted; if the grating is driven, light is diffracted.

The light is filtered to pass only the diffracted light. By projecting an image at the spatial light modulator 3, a one-dimensional image can be produced. The produced image is scanned using a scanning device, such as a galvanometer mirror, in a direction perpendicular to the GLV lines 4 of the spatial light modulator 3. Accordingly, a two-dimensional image is produced.

The reflected light beams corresponding to the different GLV lines 4 of the spatial light modulator 3, that is, corresponding to different colors, are returned to parallel light beams which travel in somewhat different directions from each other by the cylindrical lens 2. Each beam is diffracted by the volume hologram 1 in a direction corresponding to its wavelength. As is clear by comparing with the incident side, three-color beams are diffracted in the same direction. In a subsequent projection optical system, projection of three colors can be implemented by a single optical system when sufficiently corrected for chromatic aberration.

Various modifications of the foregoing example are possible. As the light source, instead of using a lamp, natural light, light emitting diodes (LEDs), or wavelength-converted semiconductor lasers or various lasers using nonlinear optical effects can be used. Since LEDs corresponding to the three primary colors (RGB) have become available recently, these LEDs can be used as a light source. Also, wavelength-converted semiconductor lasers or various lasers using nonlinear optical effects can be used. When using such a pseudo-monochromatic light source, incoming light can directly enter from a desired direction without using a dispersive element, such as the volume hologram 1, as a branching filter at the incident side. As the dispersive optical element, in place of the volume hologram 1, a grating or plane hologram can be used.

Figure 3:
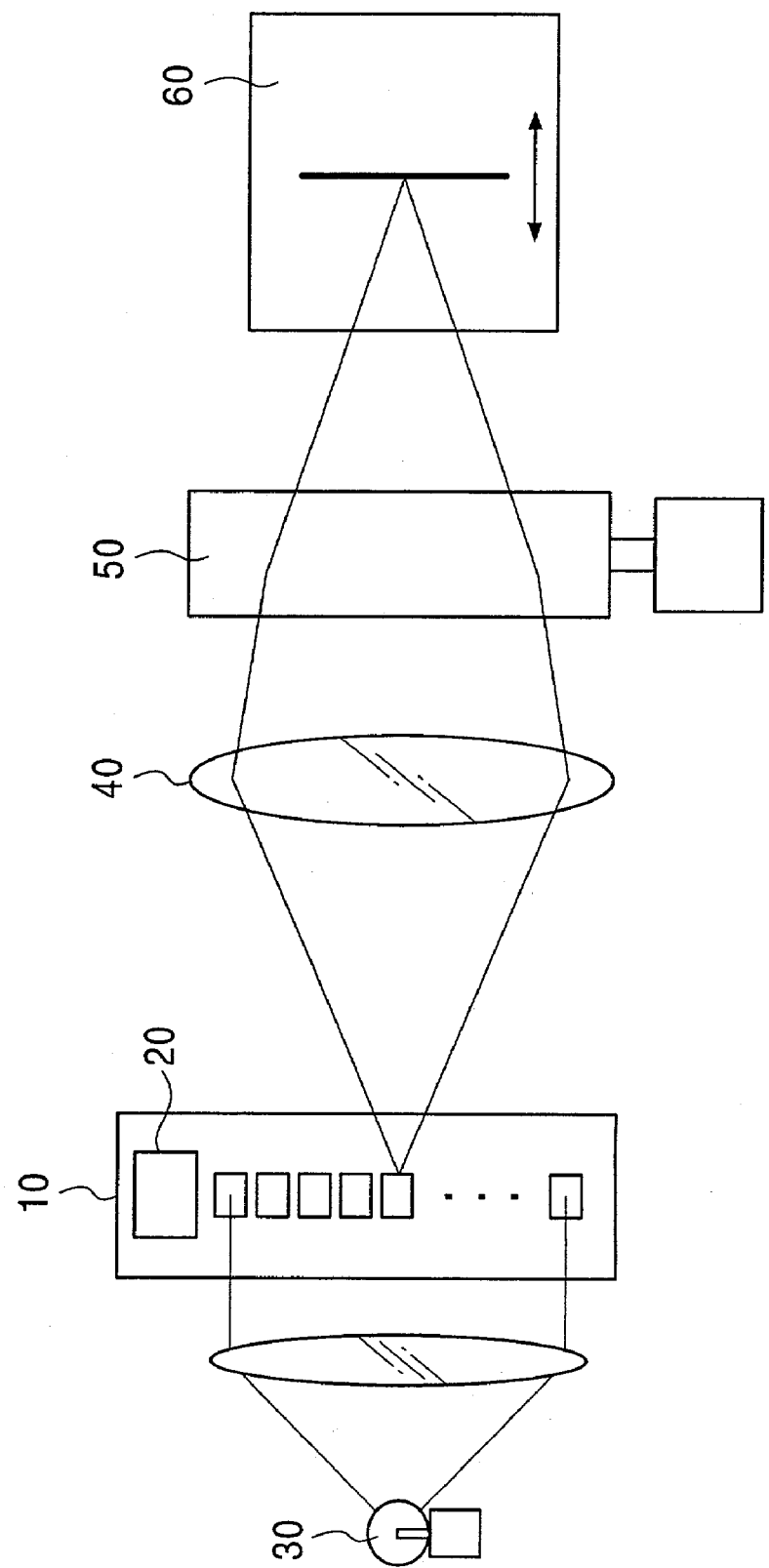
FIG. 3 illustrates an example of a GLV according to the present invention.

FIG. 3 shows the structure of a specific image display unit according to the present invention.

The image display unit, i.e., the GLV display, contains a one-dimensional linear display device 10 which is line-scanned to produce a two-dimensional image, an illuminating light source 30, a projection lens 40, a scanning mirror device 50, and a front or rear screen 60 for displaying an image.

The linear display device 10, such as that shown in FIG. 3, is formed on a substrate manufactured by depositing an Si film on an Si substrate or a glass substrate. In the linear display device 10, a memory function 20 can be embedded in the same substrate.

Figure 4:
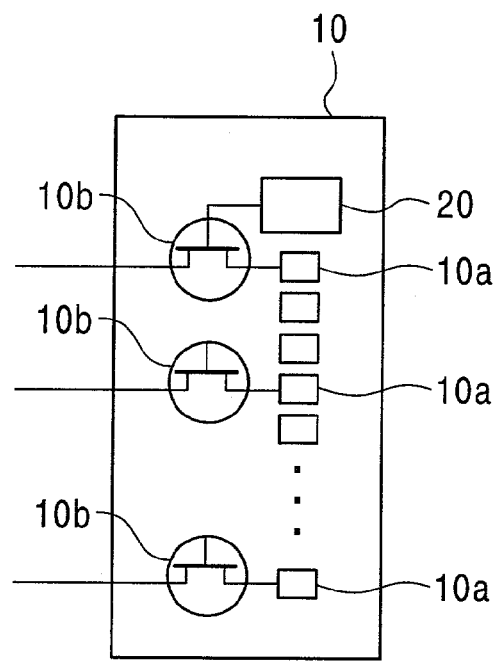
FIG. 4 illustrates a memory function which is embedded into a substrate.
Figure 5:
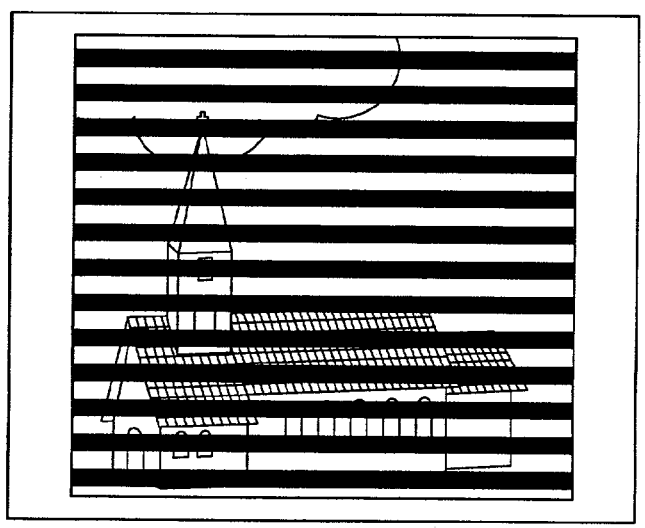
FIG. 5 illustrates a state when line scanning is performed.

Referring FIG. 4, using the memory function 20, switches 10b for switching some pixels 10a between on and off states in accordance with a video signal copy protection function are provided for the pixels 10a. Referring to FIG. 5, when the linear display device 10 is line-scanned, some pixels are turned off (inoperative) and thus horizontal lines are produced. As a result, video protection can be implemented using a very simple system.

Protection can be controlled by a scrambling signal or a digital watermark signal included in image information.

A unique number (part number) written in the memory function 20 on the linear display device 10 can discriminate between scrambling and descrambling of a video signal.

When distributing digital image information and digital data to a display terminal which uses the linear display device 10, the display terminal, namely, the user terminal, can be detected using the signal written in the memory function 20. Distribution and billing can be reliably performed.

In the display terminal using the linear display device 10, the display terminal (user terminal) can be detected using the signal written in the memory function 20. This technology can be utilized in network transactions, namely, so-called "e-commerce".

Figure 6:
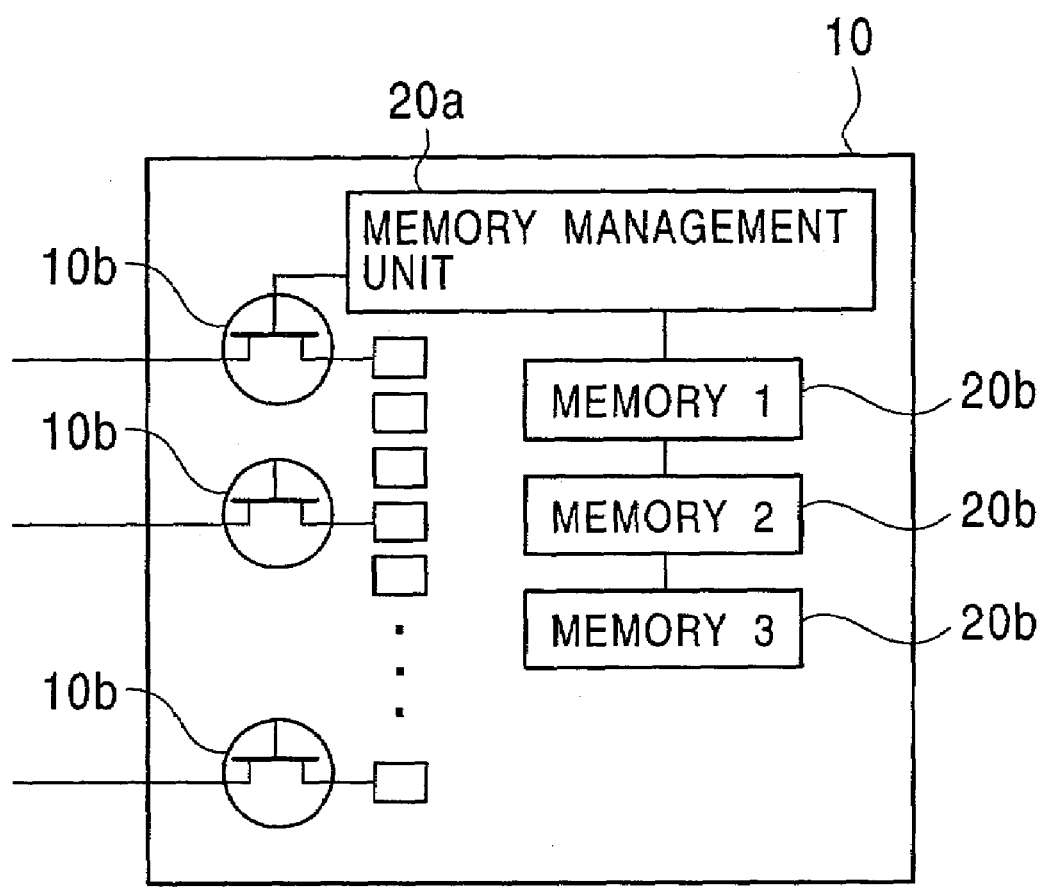
FIG. 6 illustrates an example of the structure of the memory function formed by a memory management unit and a plurality of memories.

Referring to FIG. 6, the memory function 20 is formed by a memory management unit 20a and a plurality of memories 20b. A plurality of ID numbers of the linear display device 10 is written in these memories 20b. A combination of these ID numbers and a memory management function can prevent illegal access even when some of the ID numbers are disclosed.

As described above, according to the one-dimensional linear display device 10, which is line-scanned to produce a two-dimensional image, video copy protection can be easily implemented by a very simple system for turning off a few pixels.

According to the linear display device 10 formed on the Si substrate or glass substrate, onto which the Si film is deposited, the memory function 20 can be easily embedded in the same substrate. Thus, information, such as an identification number, for controlling data can be written in the memory function 20.

A signal written in the memory function 20 can discriminate between scrambling and descrambling of a video signal.

By writing a plurality of ID numbers of the linear display device 10 in the memory function 20, a combination of these ID numbers and a memory management function can prevent illegal access even when some of the ID numbers are disclosed.

When the display terminal using the linear display device 10 is used in distribution of digital image information and digital data, the display terminal (user terminal) can be detected using the signal written in the memory function 20. Thus, distribution and billing can be performed.

According to the display terminal using the linear display device 10, the signal written in the memory function 20 can be used to detect the display terminal (user terminal). This technology can be used in network transactions, namely, e-commerce.

What is claimed is:

1. An image display unit comprising:
    a linear display device having a plurality of pixels; and
    a controller to selectively set at least one of the plurality of pixels to an off state and at least one other of the plurality of pixels to an on state while receiving a video signal at the linear display device, the selection of the on and off state being made according to a control signal input to the linear display device;
    wherein the on and off states of the plurality of pixels are selected to provide a video signal protection function:
    wherein the linear display device comprises a one-dimensional spatial light modulator: and wherein the on and off states of the plurality of pixels are selected to produce a displayed image having blank horizontal lines across the image.

2. An image display unit according to claim 1, wherein device ID information is embedded in a memory of the linear display device.

3. An image display unit according to claim 1, wherein the linear display device is formed on a substrate which is at least coated with Si, and a memory in which information for adding a protection function is written is formed on the same substrate.

4. An image display unit according to claim 3, wherein device ID information is written in the memory.

5. An image display unit according to claim 4, wherein the device ID information comprises a plurality of ID numbers.

* * * * *